United States Patent [19]
Wilson et al.

[11] Patent Number: 5,664,662
[45] Date of Patent: Sep. 9, 1997

[54] VACUUM COMBINER

[75] Inventors: Quentin Lynn Wilson, Big Island; Marty Nelson Witt, Bedford; George Henry Dawson, III, Madison Heights, all of Va.

[73] Assignee: Simplimatic Engineering Company, Lynchburg, Va.

[21] Appl. No.: 535,483

[22] Filed: Sep. 28, 1995

[51] Int. Cl.⁶ .................................................. B65G 47/12
[52] U.S. Cl. ........................................ 198/453; 198/689.1
[58] Field of Search ...................................... 198/453, 454, 198/689.1

[56] References Cited

U.S. PATENT DOCUMENTS

| | | |
|---|---|---|
| 3,352,404 | 11/1967 | Settembrini . |
| 4,669,604 | 6/1987 | Lenhart . |
| 4,727,953 | 3/1988 | Winchester . |
| 4,768,643 | 9/1988 | Lenhart . |
| 5,129,504 | 7/1992 | Smith . |
| 5,170,879 | 12/1992 | Smith . |
| 5,311,979 | 5/1994 | Risley et al. . |

*Primary Examiner*—Joseph E. Valenza
*Attorney, Agent, or Firm*—St. Onge Steward Johnston & Reens

[57] ABSTRACT

A vacuum combiner is provided comprising a vacuum chamber with a wear surface forming one side thereof, a plurality of air pervious conveying surfaces, a guide rail extending across the conveying surfaces toward a single file lane, and a vacuum suction region in the wear surface on an upstream side of the guide rail. The vacuum suction region extends approximately an article width upstream of the guide to prevent article tipping without impeding article movement between the conveying surfaces toward the single file lane.

19 Claims, 3 Drawing Sheets

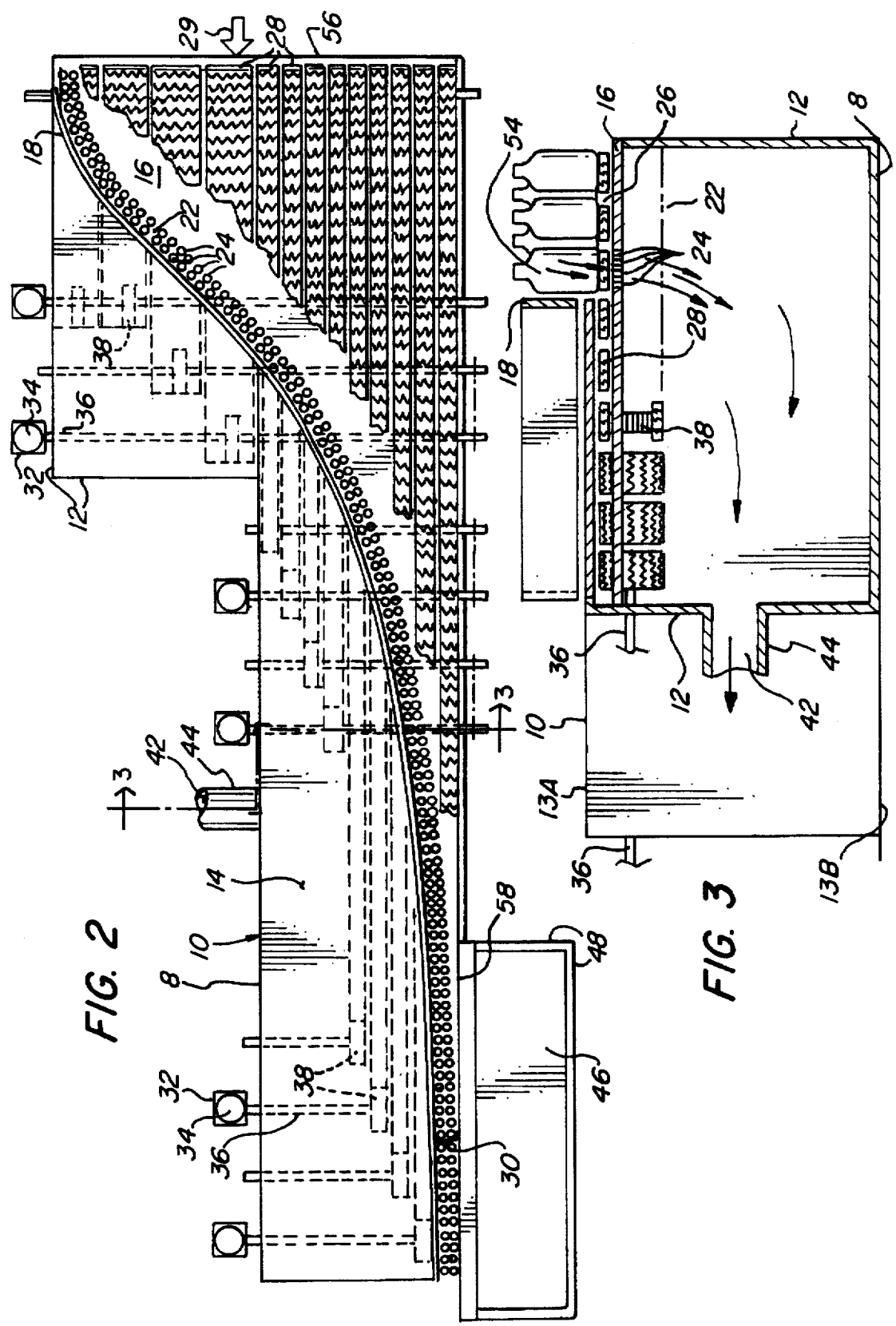

5,664,662

VACUUM COMBINER

FIELD OF THE INVENTION

The invention relates to a conveyor system for combining a mass of articles into a single file and, more particularly, to a conveyor system having multiple conveying surfaces moving at increasing speeds and a guide for moving the articles from surface to surface accelerating the articles into a single file.

BACKGROUND OF THE INVENTION

In conveyor systems for articles such as cans or bottles, it is often desired to combine a mass of articles into a singe file lane. One way of accomplishing this is to provide a stationary guide above the conveying surface which is aligned at an angle with respect to the direction of travel of chains, belts or other surfaces at increasing speeds to urge the articles toward the single file lane. With this type of passive system, however, the articles often become jammed at the single file lane requiring them to be cleared and possibly damaging equipment.

Jamming is frequently caused by articles which have been knocked over or "downed" during the single file combining process. Downed articles are knocked over when they contact the stationary guide. Articles which bounce off the guide may also knock over articles which have not yet reached the guide.

One prior art attempt at solving the problem of articles knocking down when they contact the single filing guide is illustrated in FIGS. 4–5. In this prior art device, the multiple conveying surfaces are air previous and advance over a vacuum chamber. A disadvantage of this prior system is that the vacuum impedes transference of articles from one conveying surface to an adjacent conveying surface in a direction toward the single file lane, retarding maximum article throughput. A further disadvantage of this prior system is that a large and costly vacuum pump is needed to apply a sufficient vacuum on the conveying surfaces so that articles are not knocked over when they strike the guide.

The details of constructing detail of the device illustrated in FIGS. 4–5 give rise to another disadvantage which is the complexity and therefore the cost of manufacture. The conveying surfaces of this device are formed of "table top" chain having rigid links and supported from below by a pair of spaced apart wearstrips. Making, aligning, supporting and assembling the wearstrips required for a plurality of adjacent conveying surfaces can be a significant expense.

Other known prior art conveyors including those disclosed in U.S. Pat. Nos. 4,669,604; 4,768,643 and 3,352,404, include a single belt advancing over a single vacuum chamber. The conveyer combiner systems of both the 4,669,604 and the 4,768,643 patents include a deadplate (32) and (12), respectively, for accumulating cans in diagonal rows (U.S. Pat. No. 4,669,604) or in a contiguous equilateral triangle (U.S. Pat. No. 4,768,643) prior to single filing them on a vacuum belt.

U.S. Pat. No. 5,311,979 discloses a vacuum combiner system which comprises one or more conveyer belts (30–34) which may be operated at the same or different speeds and with the same or different vacuum chambers for each belt. Inwardly extending guides which may include rollers and/or downstream air jets are also disclosed.

What is desired, therefore, is an article combiner which minimizes the knockdown of articles when they strike the guide but which does not impede transfer of articles between conveying surfaces toward the single file. An article combiner which is relatively inexpensive to manufacture and easy to assemble is also desired.

SUMMARY OF THE INVENTION

Accordingly, it is an object of the present invention to provide an article combiner which is relatively simple and inexpensive to manufacture.

Another object of the invention is to provide a combiner of the above character which aids to prevent articles tipping while permitting them to freely transfer between adjacent conveying surfaces.

Still another object of the invention is to provide a combiner of the above character having a simplified wear strip design.

A further object of the above invention is to provide a combiner of the above character which will operate with a smaller vacuum pump.

These and other objects are achieved by replacement of individual wear strips with a wear surface.

The vacuum combiner disclosed herein comprises a vacuum chamber with a wear surface forming one side thereof, a plurality of air previous conveyer webs running longitudinally over the wear surface, a guide rail extending across the wear surface above the conveyor webs toward a single file lane, and a plurality of vacuum holes in the wear surface arranged along the path on an upstream side of the guide rail. The conveyer webs are driven longitudinally in the direction of the conveyer system at relative web speeds which increase in a direction approaching the single file lane.

The holes extend approximately an article width upstream of the guide to prevent article tipping without impeding article movement between the conveyer webs toward the high speed single file lane. Preferably, the holes are arrayed in a plurality of staggered lines.

The invention and its particular features will become more apparent from the following detailed description considered with reference to the accompanying drawings.

BRIEF DESCRIPTION OF THE DRAWINGS

FIG. 2 is a top plan view of the vacuum combiner of FIG. 1 partially cut away to reveal the vacuum hole arrangement in the wear surface.

FIG. 3 is a side cross-sectional view of the vacuum conveyer combiner of FIG. 1 taken along plane (3—3) in FIG. 2 to reveal the vacuum chamber and wear surface design and construction.

DETAILED DESCRIPTION OF THE INVENTION

Figure 1:
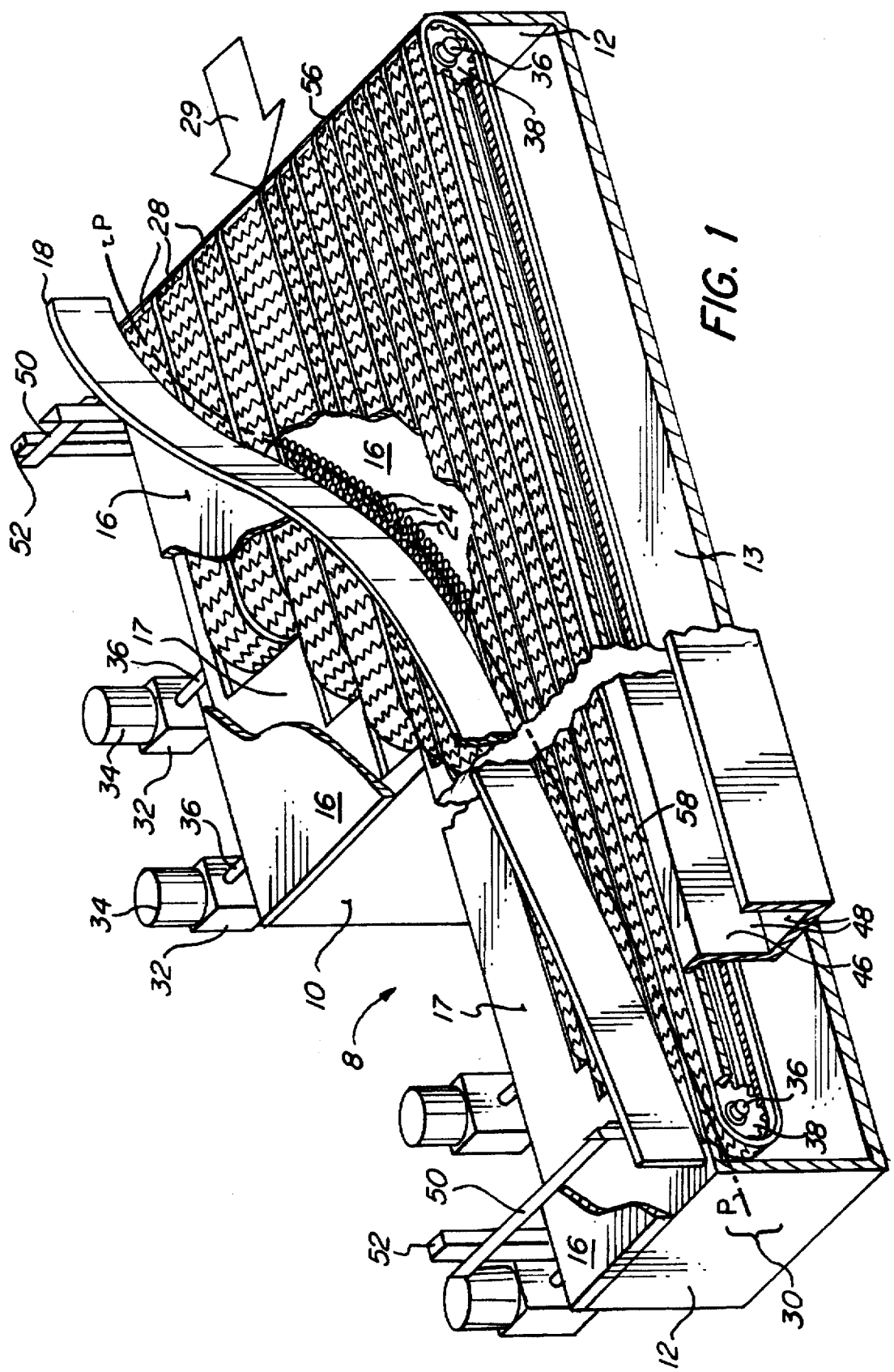
FIG. 1 is a front isometric view of a vacuum combiner partially cut away in accordance with the invention to reveal the improved wear surface design.

A vacuum combiner 8 in accordance with the invention is shown in FIGS: 1–3. Vacuum combiner 8 comprises a vacuum chamber 10 having a wear surface 16 forming a side thereof. A plurality of conveyor belts or webs 28 run longitudinally over wear surface 16 in the direction of arrow 29. A guide rail 18 traverses wear surface 16 and conveyor belts 28 to direct articles toward a single file lane 30.

Vacuum combiner 8 is designed to minimize the knock down of articles conveyed thereon when they strike the guide rail 18 without impeding the transfer of articles between conveying surfaces 28 as they are transported towards the single file lane 30.

Figure 4:
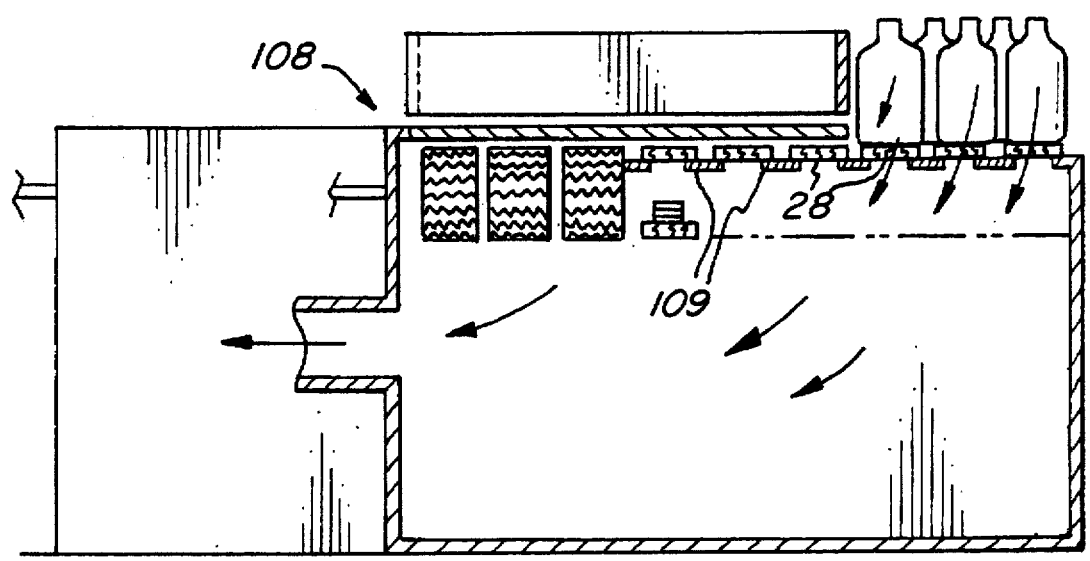
FIG. 4 is a side cross-sectional view of a prior art vacuum combiner which reveals the wearstrip design and construction.

Vacuum combiner 8 achieves these and other advantages by replacing prior art wear strips (see FIG. 4) with wear surface 16 making combiner 8 easier and thus less expensive to assemble and requiring a smaller and thus less expensive vacuum pump. Prior art vacuum combiner 108 included a plurality of wearstrips 109 for supporting conveyor belts 28. Combiner 108 disadvantageously requires a larger vacuum pump than combiner 8 of the invention due to the larger vacuum suction area of the prior art device. The large suction area of the prior art device also impedes single-filing since articles tend to stay on their current belt under vacuum influence instead of freely transferring over to higher speed adjacent belts toward the single file lane.

Vacuum chamber 10, in addition to wear surface 16, includes a bottom wall 13 and end walls 12. A partial top wall 17 underlying a portion of wear surface 16 to provide extra rigidity to vacuum chamber 10 in areas where no articles are conveyed.. Guide 18 is mounted to vacuum chamber 10 by uprights 52 and brackets 50. Axles 36 and sprockets 38 for training conveyor belts 28 around endless paths are also mounted to vacuum chamber 10, with axles 36 extending through the chamber to gear boxes 32 and associated motors 34. It is understood in this regard that a single motor may be used to drive two or more belts at different speeds with appropriate gearing which may be located within or outside vacuum chamber 10.

Wear surface 16 has a vacuum suction region provided as a plurality of vacuum holes 24 which are oriented in a path indicated by line P following alongside guide rail 18 across the width of vacuum chamber 10 on the upstream side thereof. It is understood that the suction region may be provided in a manner other than a plurality of holes. The vacuum holes 24 may be formed into the wear surface 16, in a variety of patterns. Preferably, the holes are arrayed in a plurality of staggered rows. The number of rows is selected to provide path P with a width substantially equal to a width of articles being combined. The holes are sized large enough that they will not readily clog yet small enough that several act upon each article for a given hole spacing.

Limiting a width of path P to a width of one article, we have found is sufficient to prevent tipping of articles when they strike guide rail 18 without impeding-transfer of articles from one conveyor web 28 to another as they are transported toward single file lane 30. Further, limiting vacuum suction to the region along path P provides a reduced vacuum intake area which allows for the use of a smaller, less expensive vacuum pump.

Conveying belts 28 are preferably formed from air previous table top conveyor, so that vacuum is pulled through the belts in the region of path P to retain articles in an upstanding position as they are guided toward lane 30. The speed of each individual conveyor web increases in a direction toward single file lane 30. Conveyor webs 28 are preferably the width of one article being transported to facilitate transfer from belt to belt, and should be provided with a smooth surface on each link to further facilitate belt to belt transfer.

Guide rail 18 non-linearly traverses the vacuum chamber 10 in a sweeping curve designed to minimize the force of contact with combining articles. The guide rail is preferably constructed from a material sufficiently rigid to deflect articles but pliable enough to prevent undue damage.

Occasionally, articles moving along path 22 onto single file lane 30, may push other articles previously on lane 30 off of combiner 10. These articles are recovered in bin 46 which is a gutter-like component running along side single file lane 30 in the region where path 22 merges with lane 30.

Air is drawn out of vacuum chamber 10 through tunnel 42 formed by tube 44 in cooperation with a vacuum pump (not depicted). As the air is drawn out of vacuum chamber 10, a vacuum is formed which causes air to flow through holes 24 of path P into vacuum chamber 10. The resulting suction prevents tipping of the articles 54 (see FIG. 3) which are being transported along path P towards single file lane 30. The vacuum within vacuum chamber 14 is more easily maintained since there is a reduced air intake area as compared with prior art device 108 (see FIG. 4) which is completely open between wear strips 109. Accordingly, the present invention requires the utilization of a smaller, less expensive vacuum pump.

A mass of articles (not shown) enter vacuum combiner 8 at 56, and are transported by conveyor surfaces 28 towards path P. As the articles approach path P they may preferably transfer to adjacent higher speed conveyors under influence of line pressure. This is possible, since vacuum suction is only applied to the articles along path P—as compared with prior art device 108 (see FIG.) wherein vacuum suction is applied over the entire conveying surface. Articles which do not automatically transfer to lane 30 may strike guide rail 18. The suction generated by the vacuum holes 24 of path P ensure that articles striking guide 18 will neither tip over nor bounce back to knock over other articles. Once on single file path P articles 54 are transported towards the single file lane 30 from conveyor web 28 to conveyor web 28 by line pressure. The articles 54 are accelerated as they move between conveyor webs 28 towards the single file lane 30.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A conveyor for combining articles from a mass to a single file comprising:

a single file lane;

a vacuum chamber;

a wear surface forming at least a portion of one side of said vacuum chamber;

a plurality of conveying surfaces adjacent said single file lane, each said conveying surface supported by said wear surface and circulating at a speed increasing with proximity to said single file lane;

a guide mounted above and traversing said plurality of conveying surfaces for urging articles toward said single file lane; and a plurality of holes in said wear surface in a path substantially parallel to said guide to aid in preventing articles from tipping upon striking said guide while permitting articles to freely move between ones of the plurality of conveying surfaces before reaching said guide.

2. The vacuum combiner of claim 1 wherein the path of said plurality of holes has a width approximately equal to a width of the article being combined.

3. The vacuum combiner of claim 2 wherein said guide is non-linear.

4. The vacuum combiner of claim 3 wherein said plurality of holes are arranged in staggered rows.

5. The vacuum combiner of claim 1 wherein the path of holes non-linearly traverses said main member.

6. The vacuum combiner of claim 1 wherein the conveying surfaces have a width approximately equal to a width of the article being combined.

7. The vacuum combiner of claim 6 wherein the single file lane has a width approximately equal to a width of the article being combined.

8. A conveyor for combining articles from a mass to a single file comprising:

a single file lane;

a vacuum chamber;

a wear surface forming at least a portion of one side of said vacuum chamber;

a plurality of air pervious conveyor belts adjacent said single file lane, each said conveying surface supported by said wear surface and circulating at a speed increasing with proximity to said single file lane;

a non-linear guide mounted above and traversing said plurality of conveying surfaces for urging articles toward said single file lane; and a vacuum suction region in said wear surface in a path substantially parallel to said guide to aid in preventing articles from tipping upon striking said guide, a width approximately equal to a width of the article being combined.

9. The vacuum combiner of claim 8 wherein said plurality of holes are arranged in staggered rows.

10. The vacuum combiner of claim 8 wherein the path of holes non-linearly traverses said main member.

11. The vacuum combiner of claim 8 wherein the conveying surfaces have a width approximately equal to a width of the article being combined.

12. The vacuum combiner of claim 8 wherein the single file lane has a width approximately equal to a width of the article being combined.

13. A conveyor for combining articles from a mass to a single file comprising:

a single file lane;

a vacuum chamber;

a wear surface forming at least a portion of one side of said vacuum chamber;

a plurality of air pervious conveying surfaces adjacent said single file lane, each said conveying surface supported by said wear surface and circulating at a speed increasing with proximity to said single file lane;

a guide mounted above and traversing said plurality of conveying surfaces for urging articles toward said single file lane; and a vacuum suction region in said wear surface in a path substantially parallel to said guide to aid in preventing articles from tipping upon striking said guide.

14. The vacuum combiner of claim 13 wherein the path of said plurality of holes has a width approximately equal to a width of the article being combined.

15. The vacuum combiner of claim 14 wherein said guide is non-linear.

16. The vacuum combiner of claim 15 wherein said plurality of holes are arranged in staggered rows.

17. The vacuum combiner of claim 13 wherein the path of holes non-linearly traverses said main member.

18. The vacuum combiner of claim 13 wherein the conveying surfaces have a width approximately equal to a width of the article being combined.

19. The vacuum combiner of claim 18 wherein the single file lane has a width approximately equal to a width of the article being combined.

* * * * *